(12) United States Patent
Schindler et al.

(10) Patent No.: US 7,422,258 B2
(45) Date of Patent: Sep. 9, 2008

(54) MOTOR VEHICLE DOOR HANDLE

(75) Inventors: Mirko Schindler, Velbert (DE); Helmut Schumacher, Coesfeld (DE); Helmut Klein, Velbert (DE)

(73) Assignee: Huf Hulsbeck & Furst GmbH & C. KG, Velbert (DE)

( * ) Notice: Subject to any disclaimer, the term of this patent is extended or adjusted under 35 U.S.C. 154(b) by 0 days.

(21) Appl. No.: 11/659,292

(22) PCT Filed: May 4, 2005

(86) PCT No.: PCT/EP2005/004869

§ 371 (c)(1),
(2), (4) Date: Feb. 1, 2007

(87) PCT Pub. No.: WO2006/015631

PCT Pub. Date: Feb. 16, 2006

(65) Prior Publication Data

US 2008/0018127 A1     Jan. 24, 2008

(30) Foreign Application Priority Data

Aug. 6, 2004   (DE) ................. 10 2004 038 569

(51) Int. Cl.
*B60J 9/00* (2006.01)

(52) U.S. Cl. .................................. 296/1.02; 340/5.72

(58) Field of Classification Search ............. 296/1.02; 70/278.1, 224, 91; 340/5.72

See application file for complete search history.

(56) References Cited

U.S. PATENT DOCUMENTS

| | | | | |
|---|---|---|---|---|
| 6,740,834 | B2 * | 5/2004 | Sueyoshi et al. | 200/600 |
| 6,765,472 | B2 * | 7/2004 | Suparschi et al. | 340/5.72 |
| 6,933,831 | B2 * | 8/2005 | Ieda et al. | 340/5.72 |
| 7,091,823 | B2 * | 8/2006 | Ieda et al. | 340/5.72 |
| 7,180,281 | B2 * | 2/2007 | Inuzuka et al. | 324/72.5 |
| 7,217,899 | B2 * | 5/2007 | Hidaka et al. | 200/600 |
| 7,333,021 | B2 * | 2/2008 | Ieda et al. | 340/5.72 |
| 2003/0107473 | A1 * | 6/2003 | Pang et al. | 340/5.72 |
| 2005/0073804 | A1 * | 4/2005 | Maruyama et al. | 340/5.72 |
| 2006/0232378 | A1 * | 10/2006 | Ogino et al. | 340/5.72 |
| 2007/0096905 | A1 * | 5/2007 | Ieda et al. | 340/5.72 |
| 2007/0290792 | A1 * | 12/2007 | Tsuchimochi et al. | 340/5.72 |
| 2008/0079537 | A1 * | 4/2008 | Touge | 340/5.72 |

* cited by examiner

Primary Examiner—Kiran B. Patel
(74) Attorney, Agent, or Firm—Fay Sharpe LLP

(57) ABSTRACT

A motor vehicle door handle includes a grip area and an electronics module arranged inside the grip area. A plastic injection moulded carrier core extends inside the motor vehicle door handle. The electronics module is arranged in a recess of the carrier core. A covering layer, which is made of plastic and which forms an outer wall of the motor vehicle door handle, is injected around the carrier core and the electronics module. Preferably, the carrier core is an injection moulded part having a foam structure, produced according to a MuCell method.

19 Claims, 1 Drawing Sheet

MOTOR VEHICLE DOOR HANDLE

The invention relates to a motor vehicle door handle with a grip region and an electronic assembly arranged within the grip region and to a method of manufacturing such a motor vehicle door handle.

DE 10242038 A1 discloses a door handle assembly for a motor vehicle door, for whose manufacture a plastic base body with an internal cavity is firstly provided, the cavity extending over the entire length of the handle, particularly into its grip region, and having a first opening arranged in an end surface of the handle and a second opening situated at or behind the door wall. An elongate, flexible printed circuit board arrangement accommodates electronic assemblies (for instance a ferrite bar antenna and control circuits) and has a "foil tail" at one end with supply leads for the electronic assemblies. Starting with the foil tail, the elongate printed circuit board arrangement carrying components is slid through the end opening into the cavity in the handle body until the end of the supply lines passes out of the oppositely disposed opening of the handle cavity at the door wall. The opening, through which the electronic assembly is inserted, is then closed by an end cap, this end cap simultaneously being connected to the electronic assembly and carrying it. During or after insertion of the elongate circuit board into the cavity, it can be filled with a sealing compound. The sealing compound is then caused to set.

In addition to this prior art, alternative arrangements are known in which a handle shell has a lateral opening extending substantially over the entire length of the handle shell and in which the electronic assembly is inserted through the lateral opening and subsequently surrounded by a sealing compound.

In order to achieve precise positioning of certain electronic assemblies within the door handle in the aforementioned constructions, the base body provided with the internal cavity must be manufactured precisely as regards both its external and its internal contours. The moulding in of the electronic assembly is a relatively expensive process.

A door handle arrangement is also disclosed in DE 10212794 A1, in which an electronic assembly firstly has a shell of soft plastic material moulded around it. The sealed in electronic assembly thus produced is then introduced into an injection mould and a hard plastic material is partially or completely injection moulded around it. The plastic material used for this moulding process is to be selected so that it satisfies the requirements placed on the surface (appearance, surface roughness, strength) of the motor vehicle door handle. At the same time, this plastic material takes up the major proportion of the volume of the motor vehicle door handle and thus also substantially determines the volume characteristics (for instance the overall mass).

It is the object of the invention to provide a motor vehicle door handle and a method of manufacturing it in which the material determining the outer surface and its characteristics has a relatively small influence on the volume characteristics of the door handle (for instance the mass) so that the external material can be optimised solely in accordance with the characteristics required for the external surface.

This object is solved in accordance with the invention by a motor vehicle door handle with the features of claim 1 and a method for manufacturing it with the features of claim 12.

The motor vehicle door handle in accordance with the invention has an injection moulded plastic support core extending within the interior of the door handle, an electronic assembly being disposed in a recess in the support core disposed in a grip region. A cover layer of plastic material constituting an outer wall of the motor vehicle door handle is injection moulded around the support core with the electronic assembly disposed therein.

The plastic material, which determines the surface properties of the motor vehicle door handle, is only used in the cover layer, i.e. it takes up only a relatively small proportion of the total volume of the motor vehicle door handle. A large proportion of the volume of the motor vehicle door handle is taken up by the support core disposed in the interior, which is also produced from a plastic material by injection moulding. The material of the support core can be selected independently of the desired surface properties of the door handle so that the desired volume properties of the door handle are achieved. The material of the injection moulded plastic support core is preferably so selected that it has a low mass (or low density).

In the method in accordance with the invention for manufacturing a motor vehicle door handle with a grip region and an electronic assembly disposed in the interior of the motor vehicle door handle in the grip region, a plastic support core is firstly produced in an injection moulding process, which has a support core grip section, whereby a recess is formed in the support core grip section. The electronic assembly is then inserted into the recess. Finally, a cover layer of plastic material is injection moulded around the support core so that the cover layer constitutes the outer wall of the motor vehicle door handle and the support core grip section with material injection moulded around it constitutes the grip region of the motor vehicle door handle.

In a preferred embodiment, the support core is produced in an injection moulding process, in which an injection moulded component is formed with a foam structure. The support core is preferably produced in a MuCell process. Since this support core takes up a major proportion of the volume of the motor vehicle door handle, the overall mass of the door handle may be reduced. In a preferred embodiment, it is provided that the cover layer is at no point thicker than 15 mm and is preferably less than 5 mm thick. The minimisation of the thickness of the cover layer serves inter alia to further reduce the weight.

In a preferred embodiment of the motor vehicle door handle in accordance with the invention, connecting leads of the electronic assembly pass, starting from the recess in the support core, through a region of the support core engaging a door wall within the interior of the support core and pass out of the motor vehicle door handle at a position which, in the installed state, is disposed behind the door wall. The connecting leads can, on the one hand, be present in the recess in the interior of the support core before insertion of the electronic assembly, whereby the supply leads present in the support core are connected to contacts disposed in the recess, corresponding contacts on the electronic assembly engaging with these contacts. On the other hand, the support core can have a passage (for instance a bore), through which the connecting supply leads are passed during insertion of the electronic assembly into the recess. In this embodiment, the connecting supply lines are connected in advance to the electronic assembly.

The electronic assembly can be of one-piece construction or multiple-piece construction and be inserted into one or more component recesses. For instance, the electronic assembly can include an antenna assembly and a sensor assembly, which are inserted into associated recesses and connected to supply lines.

In one embodiment, the electronic assembly disposed in the recess can be covered by a lid extending over the recess, the cover layer being injection moulded around the support core with the electronic assembly and lid. In this case the lid protects the electronic assembly whilst the cover layer is injection moulded around it. In another embodiment, the electronic assembly can be premounted on a plastic carrier and so inserted into the recess that the plastic carrier constitutes a cover for the recess. In this case also the plastic carrier protects the electronic assembly during the subsequent injection moulding process.

It is possible that the electronic assembly is glued or moulded into the recess during the insertion process.

Advantageous and/or preferred embodiments of the invention are characterised in the dependent claims.

The invention will be described below in more detail with reference to an exemplary embodiment illustrated in the drawings, in which.

Figure 1:
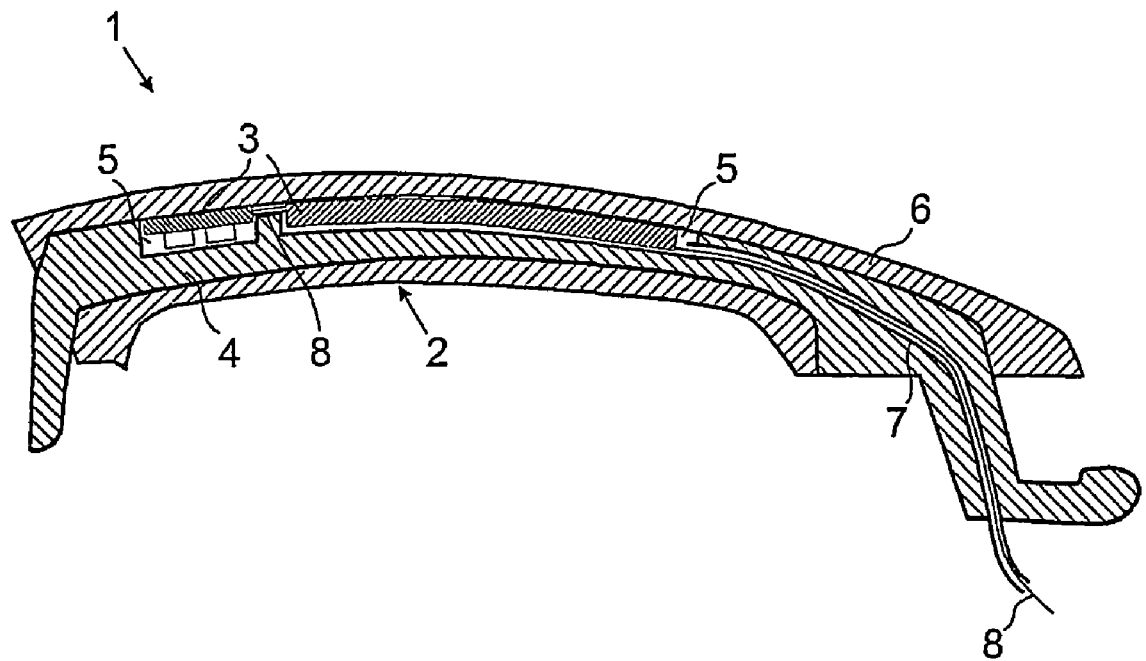
FIG. 1 is a schematic longitudinal sectional view of a first embodiment of the motor vehicle door handle in accordance with the invention.

The motor vehicle door handle 1 illustrated in FIG. 1 consists of a plastic injection moulded support core 4, around which a cover layer 6 is moulded. The support core 4 takes up the major proportion of the volume of the motor vehicle door handle 1. The support core 4 has one or more recesses 5, into which the electronic assemblies 3 are inserted. The connecting leads 8 of the electronic assemblies 3 extend to the exterior through a passage 7 defined in the interior of the support core 4 to a position which is located, in the installed state, behind a door wall, on which the door handle 1 is mounted. The recesses 5 with the electronic assemblies 3 are disposed in a grip region 2 of the door handle 1. The electronic assemblies 3 preferably include a sensor arrangement for detecting the approach of the hand of a user to the grip region 2, a transmission antenna assembly including an induction coil for emitting a longwave wake up signal for an ID transmitter of a keyless motor vehicle access system and various control circuits. The dimensions of the electronic assemblies 3 are so matched to the dimensions to the recesses 5 that the electronic assemblies close the recesses at their upper surface or only a relatively narrow gap remains between the electronic assembly and the wall of the recess. The electronic assemblies are, for instance, pre-mounted on plastic carriers (which include, for instance, printed circuit boards), whereby the plastic carriers constitute a cover for the recess 5.

Figure 2:
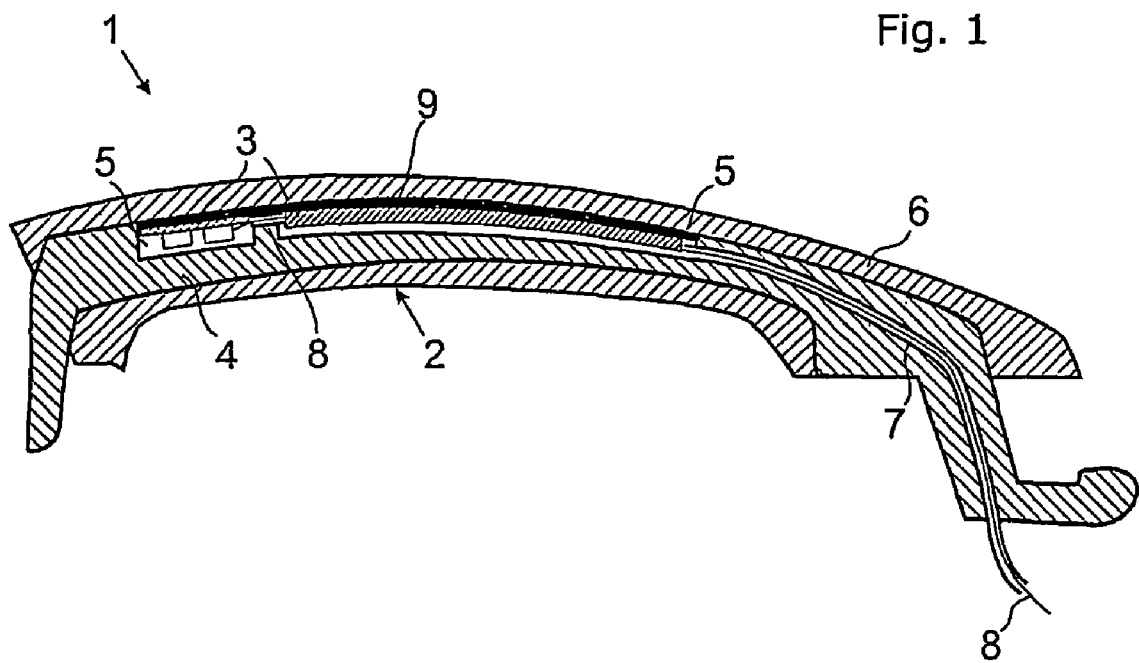
FIG. 2 is a schematic longitudinal sectional view of a second embodiment of the motor vehicle door handle in accordance with the invention.

In the alternative embodiment illustrated in FIG. 2, a lid 9 is additionally provided, which serves to cover the electronic assemblies 3 inserted into the recess 5. The dimensions of the lid 9 are also matched to the dimensions of the recess 5.

In the motor vehicle door handle in accordance with the invention, the support core takes up a large proportion of the total volume, whereby the mass of the support core 4 substantially determines the overall mass of the motor vehicle door handle. In order to achieve a small as possible a weight of the motor vehicle door handle, the injection moulded plastics support core 4 has a foam structure. The support core 4 is of stable shape and includes gas-filled pores or bubbles. Such a foam structure can be achieved by a plastic material which forms gas bubbles after injection into a mould and simultaneously or subsequently sets. The gas can be formed by chemical reactions. Preferably, however, the injection moulded plastic support core 4 is produced by an injection moulding process in which a gas (preferably nitrogen or carbon dioxide) is injected directly into the extruder of the injection moulding machine and is present in a supercritical state. A homogenous molten composition is thus provided before it is injected into the injection mould. The plastic material foams in the mould, cools and sets. Such a method is implemented by the MuCell method. This method results in a fine-celled foam structure with considerably reduced density.

In order to manufacture the motor vehicle door handle 1, the support core 4 produced by the MuCell injection moulding process is firstly provided with the electronic assembly 3 and the supply leads 8 and then inserted into a further injection mould and a cover layer 6 is injected around it therein. The plastic material of the cover layer 6 constituting the outer wall of the motor vehicle door handle 1 is so selected that the desired surface characteristics (colouration, surface roughness) are produced. The density of the plastic material of the cover layer is of secondary importance since the cover layer has a relatively small influence on the overall weight of the motor vehicle door handle 1 as a result of its small thickness.

In the preferred embodiments illustrated in FIGS. 1 and 2, the supply leads 8 are firmly connected to the electronic assembly 3 and passed through a passage 7 in the support core 4. In an alternative embodiment, supply leads 8 could be embedded during the manufacture of the support core 4 in the material of the support core during the injection moulding process. In this case, the ends of the supply leads 8 projecting into the recess 5 could be provided with contacts, the contacts being so constructed that they can engage corresponding contacts of the electronic assembly 3 when the electronic assembly 3 is inserted into the recess 5. The opposite ends of the connecting leads 8 could be connected to a plug connector, around which the plastic material of the support core is also injection moulded and which is held firmly in the support core.

The invention claimed is:

1. A motor vehicle door handle comprising:
   a grip region;
   an electronic assembly disposed in an interior of the grip region;
   an injection moulded plastic support core extending within the interior of the motor vehicle door handle;
   the electronic assembly being disposed in a recess in the injection moulded plastic support core,
   wherein a cover layer of plastic material forming an outer wall of the motor vehicle door handle is injection moulded around the injection moulded plastic support core and the electronic assembly.

2. The motor vehicle door handle of claim 1, wherein the injection moulded plastic support core is an injection moulded component having a foam structure.

3. The motor vehicle door handle of claim 2, wherein the injection moulded plastic support core is an injection moulded component made by the MuCell process.

4. The motor vehicle door handle of claim 1, wherein the cover layer is at no point thicker than 15 mm.

5. The motor vehicle door handle of claim 4, wherein the cover layer is less than 5 mm thick.

6. The motor vehicle door of claim 1, the electronic assembly comprising comprising connecting leads which, starting from the recess in the support core, pass through a region of the support core engaging a door wall in the interior of the support core and pass out of the motor vehicle door handle at a position, which is disposed behind the door wall, in the installed state.

7. The motor vehicle door handle of claim 6, wherein the connecting leads comprise cables, which cables pass through a passage starting from the recess.

8. The motor vehicle door handle of claim 7, wherein the cables passing through the passage are firmly connected to the electronic assembly.

9. The motor vehicle door handle of claim 6, wherein the connecting leads comprise leads introduced into the support core, the leads introduced into the support core being connected to contacts in the interior of the recess, the contacts in the interior of the recess being in engagement with corresponding contacts of the electronic assembly.

10. The motor vehicle door handle of claim 1, wherein the electronic assembly comprises a plurality of sub-assemblies, each of the sub-assemblies being inserted into respective component recesses in the support core.

11. The motor vehicle door handle of claim 1, wherein the electronic assembly disposed in the recess is covered by a lid extending over the recess, the cover layer being injection moulded around the support core with the electronic assembly and lid.

12. The motor vehicle door handle of claim 1, wherein the electronic assembly is pre-mounted on a plastic carrier and so inserted into the recess that the plastic carrier constitutes a cover for the recess.

13. A method of manufacturing a motor vehicle door handle, the method comprising the steps of:
   a) producing a plastic support core in an injection moulding process, the plastic support core having a support core grip section, and forming a recess in the support core grip section;
   b) inserting an electronic assembly into the recess; and
   c) injection moulding a cover layer of plastic material around the plastic support core and the inserted electronic assembly so that the cover layer constitutes an outer wall of the motor vehicle door handle and that the support core grip section constitutes a grip region of the motor vehicle door handle.

14. The method of claim 13, wherein in step a) the plastic support core is produced in an injection moulding process, in which an injection moulded component with a foam structure is formed.

15. The method of claim 13, wherein the plastic support core is produced with a MuCell process.

16. The method of claim 13, wherein the recess is produced during the production of the plastic support core by injection moulding.

17. The method of claim 13, wherein the plastic support core is produced with a supply lead passage starting from the recess, and supply leads of the electronic assembly being passed through the supply lead passage as the electronic assembly being inserted into the recess.

18. The method of claim 13, wherein after the insertion of the electronic assembly and before injection moulding the cover layer, the recess containing the electronic assembly is covered with a lid.

19. The method of claim 13, wherein the electronic assembly is premounted on a plastic plate and so inserted into the recess that the plastic plate covers the recess with the electronic assembly.

* * * * *